US009720639B1

(12) United States Patent
Morgan (10) Patent No.: US 9,720,639 B1
(45) Date of Patent: Aug. 1, 2017

(54) SYSTEMS AND METHODS FOR A SUPPLEMENTAL DISPLAY SCREEN

(71) Applicant: Brent Foster Morgan, Glendale, AZ (US)

(72) Inventor: Brent Foster Morgan, Glendale, AZ (US)

(*) Notice: Subject to any disclaimer, the term of this patent is extended or adjusted under 35 U.S.C. 154(b) by 0 days.

(21) Appl. No.: 15/289,527

(22) Filed: Oct. 10, 2016

Related U.S. Application Data

(60) Provisional application No. 62/382,878, filed on Sep. 2, 2016.

(51) Int. Cl.
*G09G 5/00* (2006.01)
*G06F 3/14* (2006.01)
*G09G 5/12* (2006.01)
*G06F 3/044* (2006.01)
*G06F 3/16* (2006.01)
*G06F 3/048* (2013.01)

(52) U.S. Cl.
CPC ............ *G06F 3/1454* (2013.01); *G06F 3/044* (2013.01); *G09G 5/12* (2013.01); *G06F 3/048* (2013.01); *G06F 3/165* (2013.01); *G06F 2203/0384* (2013.01); *G09G 2330/00* (2013.01); *G09G 2340/145* (2013.01); *G09G 2370/025* (2013.01); *G09G 2370/06* (2013.01); *G09G 2370/16* (2013.01)

(58) Field of Classification Search
CPC ........ G06F 3/1454; G06F 3/044; G06F 3/165; G06F 2203/0384; G06F 3/048; G09G 5/12; G09G 2370/16; G09G 2370/06; G09G 2370/025; G09G 2330/00; G09G 2340/145

See application file for complete search history.

(56) References Cited

U.S. PATENT DOCUMENTS

| 6,401,013 B1 | 6/2002 | McElreath |
| 6,931,463 B2 * | 8/2005 | Striemer ............. H04M 1/7253 709/203 |
| 7,266,391 B2 | 9/2007 | Warren |

(Continued)

FOREIGN PATENT DOCUMENTS

| EP | 2872964 A1 | 5/2015 |
| WO | 2014088475 A1 | 6/2014 |

OTHER PUBLICATIONS

"InVue Security CT300 Commercial Tablet Security," InVue Security Products 2016.

(Continued)

*Primary Examiner* — Adam R Giesy
(74) *Attorney, Agent, or Firm* — Knobbe, Martens, Olson & Bear LLP (57) ABSTRACT

An electronic display replicator for a primary portable computing device may comprise a case, an electronic display screen coupled to the case, and a control system disposed within the case. The control system is configured to establish a wireless communication channel between the electronic display replicator and the primary portable computing device to allow the transposition of data from a display screen of the primary portable computing device onto the electronic display screen. The control system allows the electronic display screen of the electronic display replicator to act in place of the first display to operate and control the primary portable computing device.

19 Claims, 4 Drawing Sheets

(56) References Cited

U.S. PATENT DOCUMENTS

| | | | |
|---|---|---|---|
| 7,523,226 B2 * | 4/2009 | Anderson | G08C 17/02 710/11 |
| 7,911,409 B1 | 3/2011 | Chatterjee et al. | |
| 8,340,721 B2 | 12/2012 | Moran et al. | |
| 8,588,758 B2 | 11/2013 | Ullrich | |
| 9,383,961 B2 | 7/2016 | Dusterhoff | |
| 9,405,362 B2 | 8/2016 | Wilson et al. | |
| 2008/0246736 A1 | 10/2008 | Han | |
| 2009/0167774 A1 * | 7/2009 | Want | G06F 3/1431 345/543 |
| 2010/0060572 A1 | 3/2010 | Tsern | |
| 2011/0239142 A1 | 9/2011 | Steeves et al. | |
| 2012/0178368 A1 * | 7/2012 | Fleck | H04W 52/0274 455/41.2 |
| 2012/0309462 A1 | 12/2012 | Micev | |
| 2013/0033435 A1 * | 2/2013 | Raveendran | G06F 3/0481 345/173 |
| 2013/0081089 A1 * | 3/2013 | Kim | H04N 21/4122 725/61 |
| 2014/0055344 A1 * | 2/2014 | Seo | G06F 3/0487 345/156 |
| 2014/0092005 A1 * | 4/2014 | Anderson | G06F 3/011 345/156 |
| 2014/0092108 A1 | 4/2014 | Moon et al. | |
| 2014/0092259 A1 * | 4/2014 | Tsang | G06F 1/1632 348/207.1 |
| 2014/0282751 A1 * | 9/2014 | Lee | H04N 21/4104 725/80 |
| 2014/0341108 A1 * | 11/2014 | Desai | H04L 5/0032 370/328 |
| 2015/0074541 A1 | 3/2015 | Schwartz et al. | |
| 2016/0173564 A1 | 6/2016 | He et al. | |
| 2016/0216952 A1 | 7/2016 | Zeung et al. | |

OTHER PUBLICATIONS

Ian Paul, "How to Turn your Android Phone and Windows 10 PC into a Dynamic Duo with Cortana," Hassle-Free PC/column/Hassle-Free-PC/, Jan. 15, 2016.

AT&T, "Integrated Laptops and Tablets," AT&T Business Directl Premier Business Center, https://www.wireiess.att.com/businesscenter/solutions/wirelesslaptop/integrateddevices/index.jsp, Accessed Aug. 17, 2016.

Engadget, "PopSLATE gives your iPhone a second (not so useful) screen," https://www.engadget.com/2015/04/22/popslate-gives-your-iphone-a-second-not-so-useful-screen/, Apr. 22, 2015.

* cited by examiner

SYSTEMS AND METHODS FOR A SUPPLEMENTAL DISPLAY SCREEN

CROSS-REFERENCES TO RELATED APPLICATIONS

This application claims the benefit of U.S. Provisional Patent Application No. 62/382,878, filed Sep. 2, 2016, and incorporates the disclosure of the application by reference.

BACKGROUND OF INVENTION

Most portable personal electronic devices utilize screen sizes of less than six inches to enable them to be more portable by fitting into pockets or small bags. While this small size provides portable convenience, the smaller screen size relative to desktop computers or portable tablet computers makes it more difficult for users to watch videos, read e-mail, type, and interact with the device. Prior attempts to overcome these deficiencies have required direct physical connection between the portable personal electronic device and a separate display system. Further, current systems and methods for establishing a communication channel between two electronic devices do not provide functionality that enables the separate display system to operate the portable personal electronic device. In addition, current systems and methods cannot utilize certain wireless communication protocols to transmit and/or receive certain types of data (e.g., video data) while allowing the portable personal electronic device to maintain a separate and independent wireless communication to a network.

SUMMARY OF THE INVENTION

An electronic display replicator for a primary portable computing device may comprise a case, an electronic display screen coupled to the case, and a control system disposed within the case. The control system is configured to establish a wireless communication channel between the electronic display replicator and the primary portable computing device to allow the transposition of data from a display screen of the primary portable computing device onto the electronic display screen. The control system allows the electronic display screen of the electronic display replicator to act in place of the first display to operate and control the primary portable computing device.

BRIEF DESCRIPTION OF THE DRAWINGS

A more complete understanding of the present invention may be derived by referring to the detailed description when considered in connection with the following illustrative figures. In the following figures, like reference numbers refer to similar elements and steps throughout the figures.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various types of portable computing devices, display systems, communication protocols, networks, software/firmware, and the like. In addition, the present technology may be practiced in conjunction with any number of electronic devices and communication networks, and the system described is merely one exemplary application for the technology.

Systems and methods for an electronic display replicator according to various aspects of the present technology may operate in conjunction with any suitable portable electronic device and communication network. Various representative implementations of the present technology may be applied to any system for communicating information/data between two electronic devices.

Figure 1:
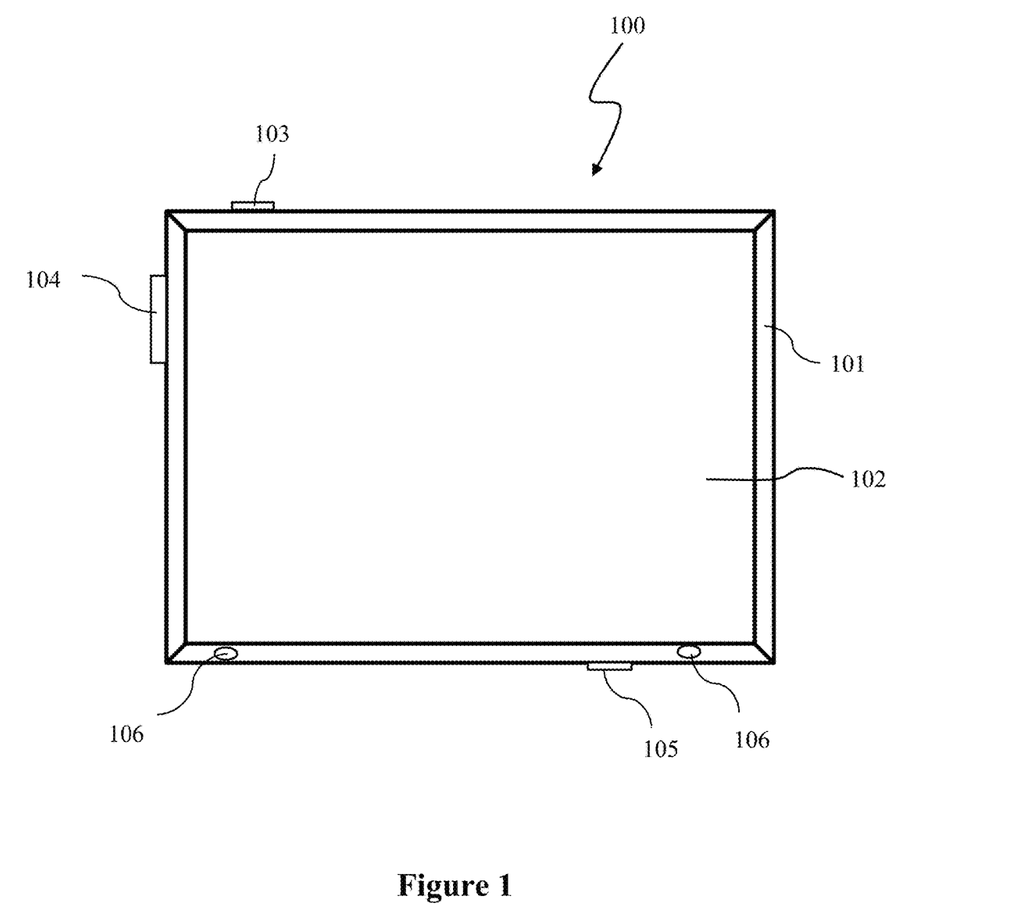
FIG. 1 representatively illustrates a electronic display replicator according to one embodiment of the technology.
Figure 2:
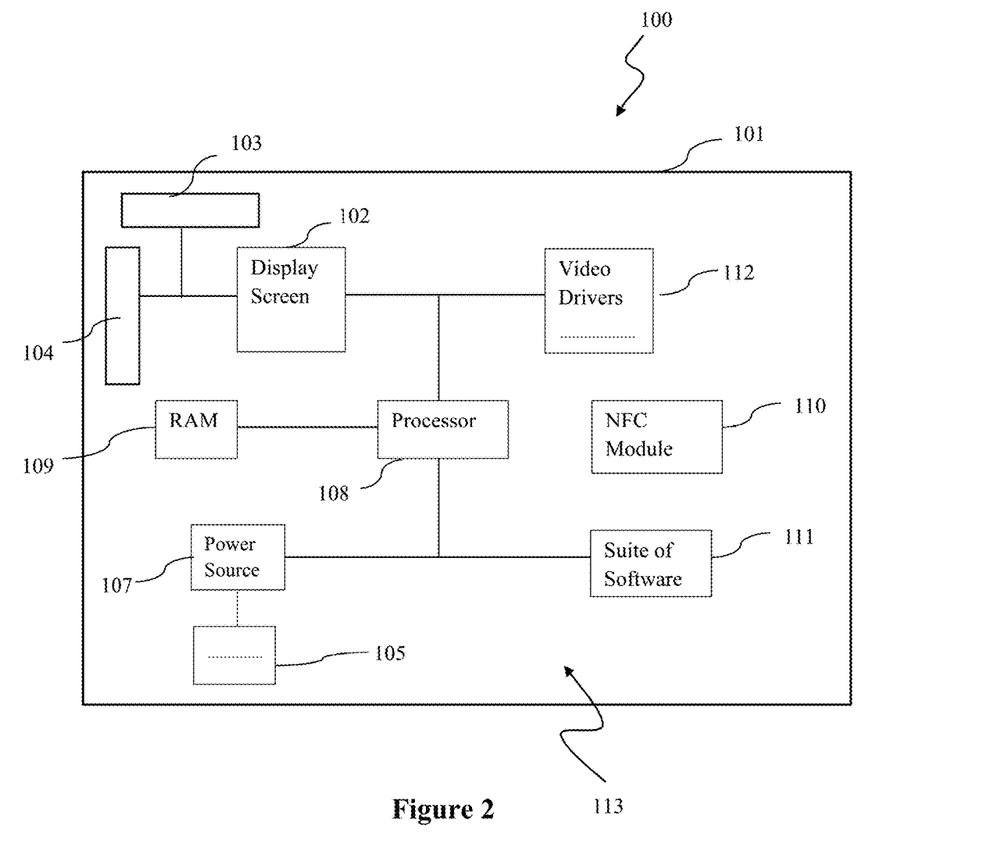
FIG. 2 representatively illustrates the various components of the electronic display replicator.
Figure 3:
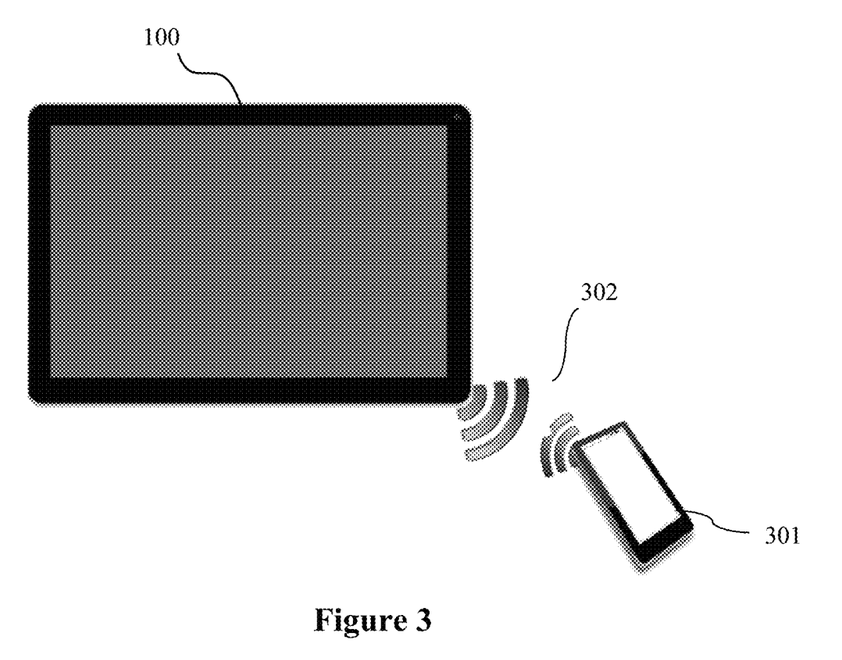
FIG. 3 representatively illustrates the electronic display replicator communicatively coupled to a primary portable computing device.

Referring now to FIGS. 1-3, in one embodiment, an electronic display replicator 100 may be configured to operate in conjunction with a primary portable computing device 301. The electronic display replicator 100 may be configured to receive information and/or data from the primary portable computing device 301 via a wireless communication channel 302 established between the electronic display replicator 100 and the primary portable computing device 301. The electronic display replicator 100 may further be configured to operate the primary portable computing device 301 based on input commands received from a user.

Referring now to FIGS. 1 and 2, in one embodiment, the electronic display replicator 100 may comprise a casing 101 configured to hold a display screen 102. The casing 101 may comprise any suitable device or system for housing, holding, or otherwise enclosing various components. For example, the casing 101 may comprise an upper surface (not shown) and a lower surface (not shown). The upper and lower surface may be coupled together to form an interior volume suitably configured to house a plurality of electronic components and the display screen 102.

The casing 101 may comprise any material such as plastics, metals, composite, and/or the like such as: aluminum; molded polymers; polymer-based composites; fiber-reinforced polymers; injection molded polycarbonate; acrylonitrile butadiene styrene ("ABS") plastic; polypropylene; polyethylene; and polystyrene; polyvinyl chloride ("PVC"); or any suitable combination or mixture thereof. The casing 101 may be manufactured as a single piece, or the casing 101 may be manufactured in separate pieces and then later assembled into a single piece.

The casing 101 may comprise one or more functional control options 103, 104, 105 to allow a user to control or operate various aspects of the electronic display replicator 100. The control options 103, 104, 105 may comprise any suitable system or device configured to operate the electronic display replicator 100, control functions, and/or its various components. The control options 103, 104, 105 may be electrically and/or communicatively coupled to the various electrical components of the electronic display replicator 100. The control options 103, 104, 105 may comprise any suitable button, dial, slider, switch, tab such as: volume controls; on/off controls; a charging port; audio port; and/or the like. The control options 103, 104, 105 may be configured to be affixed to the casing 101, detachably coupled to the casing 101, integrated with or into the casing 101, and/or otherwise positioned along an outer surface of the casing 101.

For example, the control option for a power switch 103 may be electrically and/or communicatively coupled to a component of the electronic display replicator 100 configured to turn the electronic display replicator 100 on and off. In another example, a charging port control option 105 may be electrically and/or communicatively coupled to a power source (battery) 107 such that the charging port control option 105 is configured to provide electrical power to the power source 107 to facilitate charging.

In one embodiment, the electronic display replicator may comprise sound system 106. The sound system 106 may comprise any suitable system or deice configured to emit an audible sound. For example, the sound system 106 may comprise a set of speakers configured to emit audible information regarding either one of the electronic display replicator 100, the primary portable computing device 201, and/or a combination of the two via the wireless communication channel 202.

In an alternative embodiment, some control options may be displayed on the display screen rather than embodied as a physical control button or switch. In such a configuration, one or more control options may be provided to the user via the electronic display screen 102 once the electronic display replicator 100 has been turned on and/or otherwise activated. For example, the control options may appear on the electronic display screen 102 such that the user can use their finger to activate the various control options for volume, brightness, and/or the like.

The electronic display replicator 100 may also be configured to be powered on without the need for a physical toggle and/or an on/off switch. For example, the electronic display replicator 100 may be configured to power on in response to the display screen 102 being touched in a particular location or sense when an operator is in close proximity to the screen and then power the electronic display replicator on in reaction to the sensed presence. For example, the electronic display replicator 100 may be configured to automatically power itself on and/or otherwise activate itself when it senses the user is within a certain proximity (e.g., within 2 mm of the electronic display screen 102). Alternatively, the electronic display replicator 100 may be suitably configured to sense a touched pattern on the display screen 102 and power on in response.

In one embodiment, the plurality of control options 103, 104, 105 may be positioned at any suitable location of the casing 101. For example, the control option for the power switch 103 may be disposed anywhere along the perimeter of the casing 101. The control options may be disposed on the surface of the casing 101.

Now referring to FIG. 2, in one embodiment, the casing 101 may be configured to receive the electronic display screen 102. The casing 101 may be disposed around a perimeter of the electronic display screen 102 and while also enclosing the plurality of electronic components within the casing 101.

The electronic display screen 102 may comprise any suitable system or device configured to display images, information, and/or data. For example, the electronic display screen 102 may comprise a thin-film display device such as an LCD screen. The electronic display screen 102 may comprise a rigid and/or flexible display. The electronic display screen 102 may be configured to display information and/or data in a variety of configurations. For example, the electronic display screen 102 may be configured to display information and/or data in standard definition, high definition, ultra-high definition, and/or any other suitable format.

The electronic display screen 102 may be configured to display information in color, grayscale, black and white, and/or anything in between.

The electronic display screen 102 may comprise any suitable system or device configured to receive inputs. For example, the electronic display screen 102 may be configured with capacitive touchscreen capabilities such that the electronic display screen 102 may receive inputs via physical manipulation of the electronic display screen 102. The electronic display screen 102 may also comprise other touch screen capabilities such as resistive touch and the like.

The electronic display screen 102 may comprise any suitable size or dimension to provide the user with a larger display/viewing area than would otherwise be provided by the primary portable computing device's 201 native display screen. It is understood by those in the art that screen sizes are typically measured diagonally across the screen. For example, the electronic display screen 102 may comprise a 9.7-inch display having an aspect ratio of 16 inches by 9 inches. The electronic display screen 102 may be configured to display data and/or information in any suitable resolution and/or aspect ratio. For example, aspect ratios may comprise 1:1, 5:4, 4:3, 1.48:1, 16:9, and/or 1.85:1. The resolution may comprise standard definition, high definition, ultra-high definition 4K, and/or the like. The electronic display screen 102 may be configured to display data and/or information in any suitable resolution and/or aspect ratio. For example, aspect ratios may comprise 1:1, 5:4, 4:3, 1.48:1, 16:9, and/or 1.85:1. The resolution may comprise standard definition, high definition, ultra-high definition 4K, and/or the like.

Additionally, the form factor of the electronic display screen 102 and/or the electronic display replicator 100 may provide a user with enhanced capabilities and features not otherwise provided by the primary portable computing device alone 201. For example, the larger form factor of the electronic display screen 102 may be easier to use as it provides the user with an increased surface area to perform tasks, provide input, view data, and/or the like. Disposing the various electronic components within a larger form factor case may provide the electronic display replicator 100 with enhanced cooling/heat reduction capabilities because the various electronic components do not have to be configured to be as close in proximity as would be required in a smaller form factor such as those found in the primary portable computing device 301. Furthermore, the electronic display replicator 100 does not require all of the same components found within the primary portable computing device 301 because the electronic display replicator 100 is not used to perform processing or computing functions. The primary portable computing device 301 is used to perform all native functioning allowing the electronic display replicator 100 to act solely as a larger display system for the primary portable computing device 301. By having fewer components, the electronic display replicator 100 may be more lightweight, provide a longer lasting battery life, thinner/less bulky, more reliable, and easier to operate compared to a normal tablet computing device and/or smartphone.

In one embodiment, the electronic display replicator 100 may be configured with a processor 108, a graphics card, and a memory 109. The processor 108 may comprise any suitable device configure to provide processing capabilities. The processor 108 of the electronic display replicator 100 may configured to operate only the primary portable computing device 301 and its various capabilities/features. For example, the processor 108 of the electronic display replicator 100 may be configured to analyze, determine, and/or otherwise parse the data/information related to the primary portable computing device 301 to determine a graphical user interface to display to a user operating the electronic display replicator 100 and/or the electronic display screen 102.

The processor 108 of the electronic display replicator 100 may be configured to receive user inputs via the electronic display screen 102 and operate the primary portable computing device 301 using the reproduced graphical user interface of the electronic display replicator 100. In such a configuration, the electronic display screen 102 is simply an extension of the primary portable computing device 301 providing a larger viewable area than could otherwise be displayed on the primary portable computing device 301 itself.

The processor 108 may be configured to process data received via the wireless communication channel 302. For example, when the wireless communication channel 302 is established, data from the primary portable computing device 301 may be transmitted to the electronic display replicator 100 for display. The processor may be configured to process the data to determine whether an action needs to be taken on the electronic display replicator 100 and/or the primary portable computing device. The memory 109 may comprise any suitable device configured to provide memory capabilities and/or operate in conjunction with the processor 108 to provide processing/memory capabilities to the electronic display replicator 100.

Referring now to FIGS. 2 and 3, in one embodiment, the electronic display replicator 100 may be configured with a near-field communication (NFC) module 110. The NFC module 110 may comprise any suitable system or device configured to create, facilitate, operate, and/or manage a wireless communication channel 302 between the electronic display replicator 100 and a primary portable computing device 301. The wireless communication channel 302 may comprise any suitable connection configured to relay operational commands and/or data between the electronic display replicator 100 and the primary portable computing device 301.

The electronic display replicator 100 may comprise a control system 113 configured to operate in conjunction with a NFC module 110, a suite of software 111, and various other components in creating, facilitating, operating, and/or managing the wireless communication channel 302. The control system 113 and/or the suite of software 111 may be configured to establish a wireless communication channel between the electronic display replicator 100 and the primary portable computing device 301 to facilitate the transposition and/or reproduction of data from a native display screen of the primary portable computing device 301 onto the electronic display screen 102. For example, the electronic display replicator 100 may be configured to receive an input via the electronic display screen 102 to create a wireless communication channel 302 with the primary portable computing device 301. The NFC module 110 may communicate this request to the suite of software 111. The suite of software 111 may then be configured to create the wireless communication channel 302 between the electronic display replicator 100 and the primary portable computing device 301.

In one embodiment, the suite of software 111 may comprise any software configured to operate on, or in conjunction with, an electronic device, network, and related components. For example, the suite of software 111 may be configured to establish the wireless communication channel 302. In another example, the suite of software 111 may be further configured to sense user inputs, transmit the sensed inputs to the primary portable computing device 301, transmit/receive information/data, process information/data, and/or perform other tasks related to the operation of the electronic display replicator 100.

In one embodiment, the wireless communication channel 302 may comprise any suitable communication channel between the primary portable computing device 301 and the electronic display replicator 100. For example, the wireless communication channel 302 may comprise any suitable radio frequency such as those used for Bluetooth®, WIFI, 802.11 and/or the like. The wireless communication channel 302 may be configured to be bidirectional such that information may travel back and forth from the primary portable computing device 301 and the electronic display replicator 100. The wireless communication channel 302 may be configured to facilitate the transmission of various types of data including, but not limited to, video, audio, configuration settings, graphical user interface data, and/or the like. The wireless communication channel 302 may be configured with a bandwidth sufficient to accommodate the transmission of the various data types. For example, larger bandwidth may be required to transmit video data compared to text data.

In one embodiment, the wireless communication channel 302 between the electronic display replicator 100 and the primary portable computing device 301 may be established automatically, semi-automatically, and/or manually. The wireless communication channel 302 may be configured to exist only between the electronic display replicator 100 and the primary portable computing device 301. In other words, the wireless communication channel 302 is configured for 1-to-1 communication. For example, the wireless communication channel 302 may be automatically created when the electronic display replicator 100 is powered on and positioned within a certain geographical proximity to the primary portable computing device 301.

In one embodiment, the wireless communication channel 302 may be semi-automatically created by the user using the electronic display replicator 100. For example, the electronic display replicator 100 may be configured with a "create communication channel" option such as a button/toggle/switch. When the "create communication channel" button/toggle/switch is activated, the electronic display replicator 100 may attempt to automatically create a wireless communication channel 302 with the primary portable computing device 301. For example, if the primary portable computing device 301 has previously been used in conjunction with the electronic display replicator 100, either the primary portable computing device 301 and/or the electronic display replicator 100 may be configured to store information/data regarding that previous connection such that future wireless communication channels 202 between the two device may be created using the stored information/data.

The wireless communication channel 302 may also be created manually. The electronic display replicator 100 and/or the primary portable computing device 301 may be configured to receive information/data regarding each device. For example, the electronic display replicator 100 may be configured to receive information/data regarding the primary portable computing device 301 such as the device identification data, login/password information, network identification data, and/or the like. Similarly, the primary portable computing device 301 may be configured to receive similar information/data regarding the electronic display replicator 100 such that a wireless communication channel 302 may be created between the two devices.

Now referring to FIG. 3, in one embodiment, the primary portable computing device 301 may comprise any suitable electronic device such as a mobile phone, tablet, and/or the like. The primary portable computing device 301 may be configured with any suitable system or device configured to create a wireless communication medium with another electronic device (e.g., the electronic display replicator 100). For example, the primary portable computing device 301 may be configured with its own NFC module configured to create the wireless communication channel 302 in conjunction with another device (e.g., the electronic display replicator 100). The primary portable computing device 301 may be disposed at a remote location relative to the electronic display replicator 100. For example, the primary portable computing device 301 may be disposed and/or otherwise be placed at a different geographical location relative to the electronic display replicator 100 but still within a certain distance proximity range to facilitate the creation of the wireless communication channel 302 between the electronic display replicator 100 and the primary portable computing device 301.

In one embodiment, the wireless communication channel 302 may be configured to facilitate the bidirectional flow of information and/or data back and forth between the electronic display replicator 100 and the primary portable computing device 301. The wireless communication channel 302 may be utilized by the electronic display replicator 100 and the primary portable computing device 301 to transmit operational commands between the two devices. The operational commands may comprise any type of command, instruction, operation, and/or the like configured to be executed on an electronic device. For example, an operational command may comprise operating a feature of one of the devices (i.e., increase/decrease volume, operating the capacitive touch screen of either device, or the like).

In one embodiment, the wireless communication channel 302 may be configured to allow the primary portable computing device 301 to maintain a separate wireless network connection to a local area network that is distinct and independent from the wireless communication channel 302 created between the two devices. For example, the portable computing device 301 may be communicatively linked to a local area network (such as WIFI) prior to establishing the wireless communication channel 302 with the electronic display replicator 100. After the wireless communication channel 302 has been established, the primary portable computing device 301 may still be communicatively connected to the local area network and transmit/receive data/information via the local area network.

In one embodiment, when the wireless communication channel 302 has been established between the electronic display replicator 100 and the primary portable computing device 301, the primary portable computing device 301 may be configured to be operated via the electronic display replicator 100. In other words, the electronic display replicator 100 may act as the controller for the primary portable computing device 301. The native display screen of the primary portable computing device 301 may be turned off, put into a sleep/hibernation mode, and/or otherwise disabled such that what was originally configured to be displayed on the native display screen of the primary portable computing display device 201 is now displayed in a larger format on the electronic display screen 102 of the electronic display replicator 100. It is understood by those skilled in the art that turning off, disabling, hibernating, and/or otherwise disabling the native display screen of the primary portable computing device 301 would not hinder the performance and/or capabilities of the primary portable computing device 301. Rather, instead of displaying the information on the native display screen of the primary computing device 301, the information is instead transposed and/or reproduced on the electronic display replicator 100.

In one embodiment, the electronic display replicator 100 may be configured to operate the primary portable computing device 301 according to inputs received via the electronic display replicator 100. The received inputs received by the electronic display replicator 100 may be transmitted and/or otherwise communicated to the primary portable computing device 301 via the wireless communication channel 302 as discussed above. The received inputs by the electronic display replicator 100 may be performed by the primary portable computing device 301. For example, after the wireless communication channel 302 has been established, an instruction received by the electronic display replicator 100 to increase the volume setting may be communicated to the primary portable computing device 301 such that the volume produced by the primary portable computing device 301 is increased.

Similarly, the user may select to open an app displayed on the display screen 102 and the control system 113 may transmit the instruction to the primary portable computing device 301. The primary portable computing device 301 may then open the app which is then displayed on the display screen 102 of the electronic display replicator 100. The user may then interact with the app via the display screen 102 and in place of the screen of the primary portable computing device 301.

In one embodiment, the control system 113 may be configured to return the native display device of the portable computing device 301 to an active state in response to a user interaction with the primary portable computing device 301. The control system 113 may further cause the electronic display replicator 100 to enter into a hibernation state when the primary portable computing device 301 is returned to an active state. For example, the portable computing device 301 may comprise a cell phone that is communicatively linked to the electronic display replicator 100 via the wireless communication channel 302. The primary portable computing device 301 may receive a call which may require the user's attention. The incoming call may be configured to be displayed on the electronic display screen 102 of the electronic display replicator 100. The electronic display replicator 100 may temporarily disable the wireless communication channel and/or disable the electronic display replicator 100 from controlling the primary portable computing device 301 so that the user may operate the primary portable computing device 301 as it is normally configured to be operated (i.e., without the electronic display replicator linked to it).

Referring back to FIGS. 1-3, in one embodiment, the plurality of control options 103, 104, 105 of the electronic display replicator 100 may be utilized to control similar functions/devices of the primary portable computing device 301. The plurality of control options of the electronic display replicator 100 may be mapped, linked to, associated with, and/or otherwise generally related to a similar function of the primary portable computing device 301. For example, the electronic display replicator 100 may comprise a control option 104 for volume control. Adjusting the volume control on the electronic display replicator 100 may cause the second device 201 to increase its volume.

Figure 4:
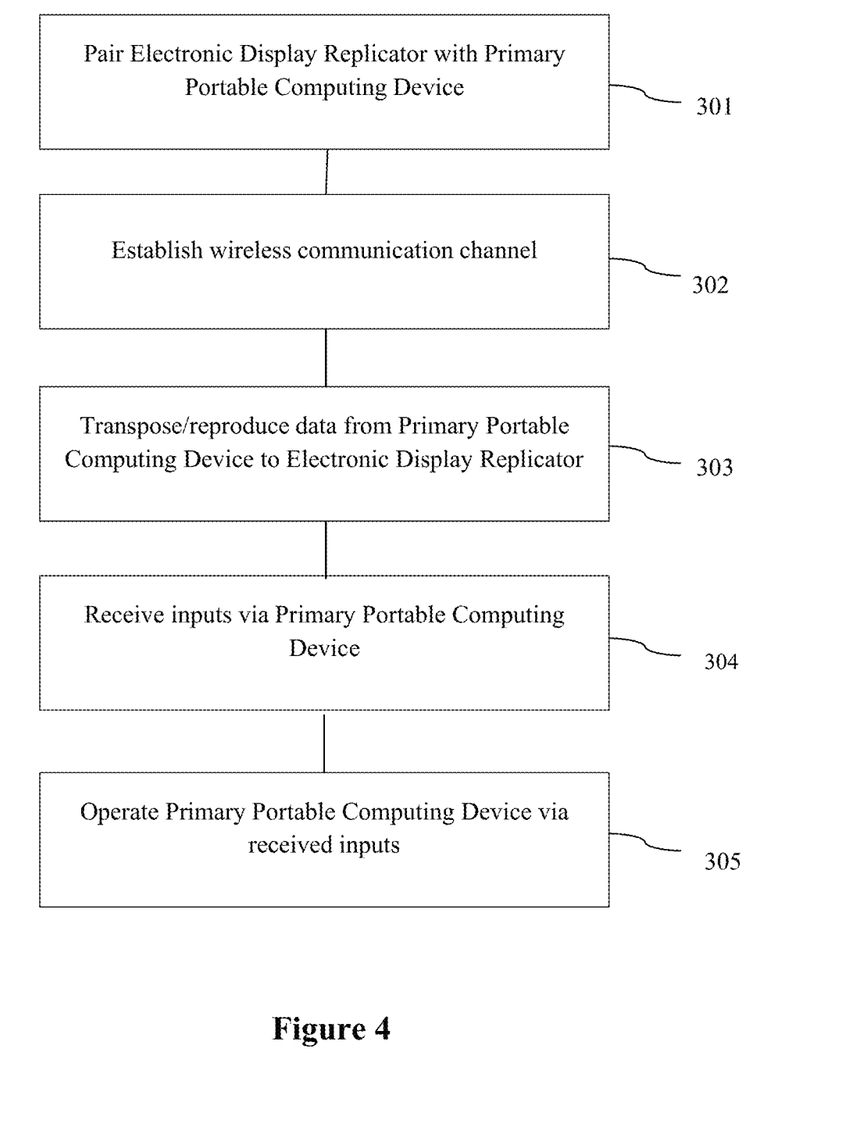
FIG. 4 representatively illustrates a method of establishing a communication channel between the electronic display replicator and another electronic device.

Now referring to FIG. 4, in operation of one embodiment, the electronic display replicator 100 may be configured to be paired and/or otherwise associated with a primary portable computing device 301 (301) over a dedicated wireless connection. The pairing and/or association process may comprise any suitable system configured to pair and/or associate two devices together. For example, the electronic display replicator 100 and the primary portable computing device may be configured to share between each other any settings, configurations, access controls, network IDs, and/or the like between each other to establish a pairing.

In one embodiment, the control system 103 may be configured to transmit a signal to the primary portable computing device 301. The signal may be configured to activate a pairing protocol between the electronic display replicator 100 and the primary portable computing device 301. Once paired and/or associated together, the electronic display replicator 100 and the primary portable computing device 301 may store the pairing information for later use. For example, once the electronic display replicator 100 and the primary portable computing device 301 have been paired together for the first time, the two devices retain information regarding that pairing/association such that the two devices do not have to undergo the process again in the future.

In one embodiment, when the two devices are paired and/or otherwise associated with each other, a wireless communication channel 302 may be established between the two devices (302). The wireless communication channel 302 may comprise any suitable system configured to establish a communication channel between two devices as discussed above. For example, the wireless communication channel 302 may comprise various wireless communication protocols such as Bluetooth®, WIFI, 802.11, radio frequency, and/or the like.

In one embodiment, after the wireless communication channel 302 has been established, data and/or information may be transposed and/or reproduced from the primary portable computing device 301 to the electronic display replicator 100 over the wireless communication channel 302 (303). The data and/or information may comprise any data and/or information regarding pictures, video, audio, and/or the like.

The data and/or information may also comprise data/information related to a data set comprising graphical user interface data. It is understood to those skilled in the art that a graphical user interface may comprise any suitable system configured to display information to a user. The graphical user interface may comprise text, icons/graphics, formatting layout, and the like. The graphical user interface data may be configured to allow the electronic display screen 102 to reproduce a graphical user interface meant to be displayed on the native display screen of the portable computing device 301. For example, the primary portable computing device 301 may provide to the electronic display replicator 100 via the wireless communication network 202 a graphical user interface data set such that the processor 108 of the electronic display replicator 100 may extract and/or otherwise retrieve from the graphical user interface dataset data/information to replicate, transpose, and/or otherwise reproduce the same graphical interface on the electronic display replicator 100 that would otherwise be configured to be displayed on the primary portable computing device 301.

In one embodiment, the electronic display replicator 100 may receive a plurality of user inputs (304). The received inputs may comprise user created inputs (e.g., a user using the capacitive touch screen of the electronic display replicator 100) and/or the received inputs may comprise inputs received from another electronic device. The received inputs may be provided to the processor 108 for processing to determine whether an action needs to be taken on either the electronic display replicator 100 and/or the primary portable computing device 301. The suite of software 111 may be configured to operate in conjunction with the processor 108.

In one configuration, the bulk of the processing may performed by the primary portable computing device 301. The primary portable computing device 301 may be configured to provide the processed data to the electronic display replicator to transpose and/or otherwise reproduce.

In one embodiment, the plurality of user inputs received by the electronic display replicator 100 may be configured to operate the primary portable computing device 301 (305). For example, if the supplemental display screen 100 received inputs to open an application, the input may be transmitted to the primary portable computing device 301 so that the primary portable computing device 301 may open the application.

The particular implementations shown and described are illustrative of the invention and its best mode and are not intended to otherwise limit the scope of the present invention in any way. Indeed, for the sake of brevity, conventional manufacturing, connection, preparation, and other functional aspects of the system may not be described in detail. Furthermore, the connecting lines shown in the various figures are intended to represent exemplary functional relationships and/or steps between the various elements. Many alternative or additional functional relationships or physical connections may be present in a practical system.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. An electronic display replicator for a primary portable computing device having a first display, comprising:

a casing;

an electronic display comprising a touchscreen coupled to the casing, wherein the electronic display touchscreen comprises a touchscreen size of at least seven inches;

a control system disposed within the casing and electrically coupled to the electronic display touchscreen, wherein control system enables the electronic display replicator to appear to function as the primary portable computing device by:

automatically establishing, upon power-up of the electronic display replicator, a wireless communication channel between the electronic display replicator and the primary portable computing device when the electronic display replicator is positioned within a certain geographical proximity of the primary portable computing device;

transposing data from the first display onto the electronic display touchscreen via the wireless communication channel to reproduce a graphical user interface and input functionality of the primary portable computing device on the electronic display touchscreen, wherein the graphical user interface comprises a plurality of icons corresponding to applications installed on the primary portable computing device; and enabling the electronic display replicator to operate the primary portable computing device via:

capturing user inputs to the reproduced graphical user interface on the electronic display touchscreen corresponding to the input functionality of the primary portable computing device after the wireless communication channel has been established; and transmitting the captured user inputs to the primary portable computing device as though the captured user inputs had been made on the first display, wherein in response to a user selecting an icon on the electronic display touchscreen of the electronic display replicator, the electronic display replicator transmits a corresponding instruction to the primary portable computing device to cause the corresponding application to open on the primary portable computing device while the first display of the primary device is turned off or hibernating;

processing data, and based at least in part on the processed data, determining whether an action is to be taken by the electronic display replicator or by the primary portable computing device, or by both the electronic display replicator and the primary portable computing device.

2. The electronic display replicator of claim 1, wherein the control system is further configured to provide a signal to the primary portable computing device to hibernate the first display after the wireless communication channel has been established.

3. The electronic display replicator of claim 2, wherein the control system is further configured to:

return the first display to an active state in response to a user interaction with the primary portable computing device; and cause the electronic display replicator to enter a hibernate state when the primary portable computing device is returned to the active state.

4. The electronic display replicator of claim 1, wherein the wireless communication channel utilizes at least one of a Bluetooth®, Wi-Fi, and 802.11 communication protocol.

5. The electronic display replicator of claim 4, wherein the wireless communication channel is configured to allow the primary portable computing device to maintain a Wi-Fi connection to a local area network after the wireless communication channel between the electronic display replicator and the primary portable computing device has been established.

6. The electronic display replicator of claim 5, wherein the wireless communication channel is configured to facilitate the transmission of video data between the electronic display replicator and the primary portable computing device while the primary portable computing device has a Wi-Fi connection to a local area network.

7. The electronic display replicator of claim 1, wherein the wireless communication channel comprises sufficient bandwidth to accommodate audio and video transmission.

8. The electronic display replicator of claim 1, wherein the wireless communication channel comprises a connection between only the electronic display replicator and the primary portable computing device.

9. The electronic display replicator of claim 1, further comprising a control option disposed on an outer surface of the casing, wherein the control option comprises at least one of a volume control, a power switch, and a charging port.

10. The electronic display replicator of claim 1, wherein the electronic display touchscreen comprises a capacitive touch screen display.

11. The electronic display replicator of claim 1, wherein the electronic display touchscreen comprises a thin-film display.

12. The electronic display replicator of claim 1, further comprising a power source disposed within the casing and configured to provide electrical power to the electronic display device.

13. An electronic display replicator for a primary portable computing device having a first display, comprising:

an electronic display touchscreen comprising a screen size of at least seven inches;

a casing configured to receive the electronic display touchscreen;

a control system disposed within the casing and electrically coupled to the electronic display touchscreen and configured to enable the electronic display replicator to appear to function as the primary portable computing device by:

automatically establishing, upon power-up of the electronic display replicator, a wireless communication channel between the electronic display replicator and the primary portable computing device;

receiving, via the wireless communication channel, a data set from the primary portable computing device, wherein the data set comprises data configured to enable the electronic display touchscreen to:

reproduce a graphical user interface of the primary portable computing device, wherein the graphical user interface comprises icons corresponding to applications installed on the primary portable computing device; and reproduce the input functionality of the first display; and operating the primary portable computing device via:

capturing user inputs to the reproduced graphical user interface displayed by the electronic display touchscreen after the wireless communication channel has been established; and transmitting the captured user inputs to the primary portable computing device as though the captured user inputs had been made on the first display, wherein in response to a user selecting an icon on the electronic display touchscreen of the electronic display replicator, the electronic display replicator transmits a corresponding instruction to the primary portable computing device to cause the corresponding application to open on the primary portable computing device;

processing data, and based at least in part on the processed data, determining whether an action is to be taken by the electronic display replicator or by the primary portable computing device, or by both the electronic display replicator and the primary portable computing device.

14. The electronic display replicator of claim 13, wherein the control system is further configured to transmit a signal to the primary portable computing device, wherein the signal is configured to activate a pairing protocol between the electronic display replicator and the primary portable computing device.

15. The electronic display replicator of claim 14, wherein the control system is configured to:

cause the electronic display replicator to enter a hibernate state when the primary portable computing device is transitioned from an inactive state to an active state while the electronic display replicator is in communication with the primary portable computing device.

16. The electronic display replicator of claim 13, wherein the wireless communication channel utilizes at least one of a Bluetooth®, Wi-Fi, and 802.11 communication protocol.

17. The electronic display replicator of claim 13, wherein the wireless communication channel is configured to allow the primary portable computing device to maintain a Wi-Fi connection to a local area network after the wireless communication channel between the electronic display replicator and the primary portable computing device has been established.

18. The electronic display replicator of claim 13, wherein the wireless communication channel comprises a connection between only the electronic display replicator and the primary portable computing device.

19. The electronic display replicator of claim 17, wherein the wireless communication channel is configured to facilitate the transmission of video data between the electronic display replicator and the primary portable computing device while the primary portable computing device has a Wi-Fi connection to the local area network.

\* \* \* \* \*